US007721819B2

(12) United States Patent
Lauterwald

(10) Patent No.: US 7,721,819 B2
(45) Date of Patent: May 25, 2010

(54) ROTARY HAMMER

(75) Inventor: Martin Lauterwald, Huenstetten (DE)

(73) Assignee: Black & Decker Inc., Newark, DE (US)

( * ) Notice: Subject to any disclaimer, the term of this patent is extended or adjusted under 35 U.S.C. 154(b) by 123 days.

(21) Appl. No.: 12/171,833

(22) Filed: Jul. 11, 2008

(65) Prior Publication Data

US 2009/0014195 A1 Jan. 15, 2009

(30) Foreign Application Priority Data

Jul. 11, 2007 (GB) ................................ 0713432.3

(51) Int. Cl.
*B25D 9/04* (2006.01)
*B23B 45/02* (2006.01)

(52) U.S. Cl. ......................... 173/201; 173/48; 173/109; 173/217

(58) Field of Classification Search ................... 173/48, 173/109, 201, 216, 217, 178
See application file for complete search history.

(56) References Cited

U.S. PATENT DOCUMENTS

| | | | | |
|---|---|---|---|---|
| 3,990,523 | A | 11/1976 | Schramm et al. | |
| 4,442,906 | A * | 4/1984 | Simpson | 173/48 |
| 5,775,440 | A * | 7/1998 | Shinma | 173/109 |
| 6,015,017 | A * | 1/2000 | Lauterwald | 173/48 |
| 6,227,309 | B1 * | 5/2001 | Henke et al. | 173/201 |
| 6,237,700 | B1 * | 5/2001 | Berger et al. | 173/201 |
| 6,644,418 | B2 * | 11/2003 | Haga | 173/48 |
| 6,913,088 | B2 * | 7/2005 | Berger | 173/48 |
| 7,032,683 | B2 * | 4/2006 | Hetcher et al. | 173/1 |
| 7,121,359 | B2 * | 10/2006 | Frauhammer et al. | 173/48 |

(Continued)

FOREIGN PATENT DOCUMENTS

| | | |
|---|---|---|
| DE | 379592 | 8/1923 |

(Continued)

OTHER PUBLICATIONS

European Patent Office Search Report GB0713432.3.

(Continued)

*Primary Examiner*—Scott A. Smith
(74) *Attorney, Agent, or Firm*—Kofi Schulterbrandt; Scott B. Markow; Adan Ayala

(57) ABSTRACT

A rotary hammer includes a housing, a tool holder mounted on a front portion of the housing, and a motor mounted in the housing. The motor includes an armature shaft arranged substantially perpendicular to an axis of rotation of the tool holder and including toothing. A hammer mechanism is driven by the motor to generate impacts on a tool being held by the tool holder. The hammer mechanism includes a first intermediate shaft adjacent and substantially parallel to the armature shaft facing away from the tool holder. A rotation drive mechanism is driven by the motor to rotatingly drive a tool being held by the tool holder. The rotation drive mechanism includes a second intermediate shaft adjacent and substantially parallel to the armature shaft facing the tool holder. The toothing of the armature shaft meshes with corresponding toothing on at least one of the first intermediate shaft and the second intermediate shaft. A chain drive couples the first intermediate shaft to the second intermediate shaft so that the first and second intermediate shafts are driven together by the armature shaft.

8 Claims, 3 Drawing Sheets

U.S. PATENT DOCUMENTS

| | | | | |
|---|---|---|---|---|
| 7,204,321 | B2 * | 4/2007 | Agehara et al. | 173/49 |
| 7,506,694 | B2 * | 3/2009 | Stirm et al. | 173/178 |

FOREIGN PATENT DOCUMENTS

| | | |
|---|---|---|
| DE | 678182 | 7/1939 |
| DE | 4202767 | 8/1993 |
| DE | 19647992 | 5/1998 |
| GB | 2154497 A | 9/1985 |

OTHER PUBLICATIONS

Search Report—European Patent Office for related application EP08159597.

* cited by examiner

ROTARY HAMMER

CROSS REFERENCE TO RELATED APPLICATIONS

This application claims priority, under 35 U.S.C. §119, to UK Patent Application No. GB 07 134 32.3, filed on Jul. 11, 2007, which is incorporated herein by reference.

TECHNICAL FIELD

This application relates to rotary hammer.

BACKGROUND

In a known rotary hammer (as described in DE 42 02 767 C2), an intermediate gear wheel is provided for coupling of both intermediate shafts which intermediate gear wheel is arranged coaxially to the armature shaft and rotatably mounted by means of a bearing which bearing is mounted in the housing of the rotary hammer. By means of this intermediate gear wheel the first intermediate shaft which is rotatably driven by the armature shaft in operation of the rotary hammer, is coupled with the second intermediate shaft. In this arrangement rotation of the intermediate shaft causes a certain undesired heating due to friction, and requires relatively precise machining of the intermediate gear wheel and the gear wheels or toothing of the intermediate shafts cooperating with the intermediate gear wheel.

SUMMARY

In an aspect, a rotary hammer includes a motor with an armature shaft arranged perpendicular to the axis of rotation of the tool holder and comprising toothing, a first intermediate shaft forming part of the drive for the hammer mechanism which first intermediate shaft is provided at the side of the armature shaft facing away from the tool holder and is arranged in parallel to the armature shaft, and with a second intermediate shaft forming part of the rotary drive which second intermediate shaft is provided at the side of the armature shaft facing the tool holder and is arranged in parallel to the armature shaft. The toothing of the armature shaft meshes with a toothing of the first or the second intermediate shaft and the intermediate shafts are coupled so that the rotational movement of the intermediate shaft driven by the armature shaft is transmitted to the other intermediate shaft. Coupling of the intermediate shafts may be effected by a chain drive comprising a chain that interconnects the two intermediate shafts for driving purposes.

Implementations may include one or more of the following features. A bearing for the upper end of the armature shaft, i.e. the end nearer to the hammer mechanism, may be advantageously located between the toothing of the armature shaft and the plane of the chain. The toothing of the armature shaft may mesh with a toothing of the first intermediate shaft. The toothing of the first intermediate shaft may be formed by a gear wheel formed at the upper end of the intermediate shaft which gear wheel carries an eccentric pin which forms part of a crank drive. The chain drive may include sprockets secured to the intermediate shafts on the same height wherein the sprocket on the second intermediate shaft has a larger diameter than the sprocket on the first intermediate shaft.

Advantages may include one or more of the following. An intermediate gear wheel mounted coaxially with respect to the intermediate shaft is not required and heating generated by rotation of such an intermediate gear wheel as used in the prior rotary hammer is reduced. Further, the sprockets or the sprocket arrangements of the intermediate shafts need not to be manufactured with such a high precision, as this is required for the gear wheels provided in the known rotary hammer so that manufacturing costs are reduced. These and other advantages and features will be apparent from the description, the drawings, and the claims.

DETAILED DESCRIPTION

Figure 1:
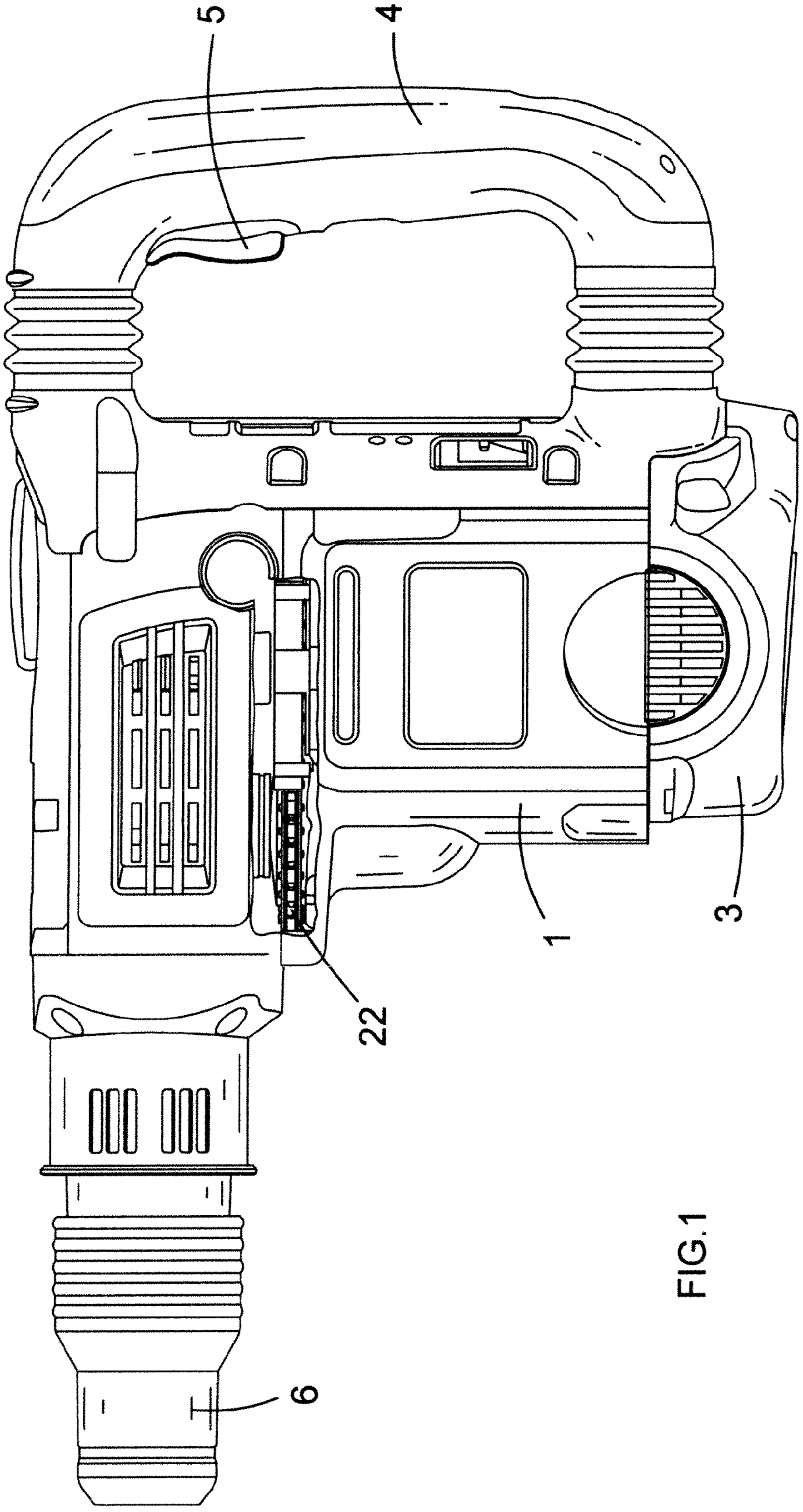
FIG. 1 shows a rotary hammer in a side view with part of a housing wall removed.
Figure 2:
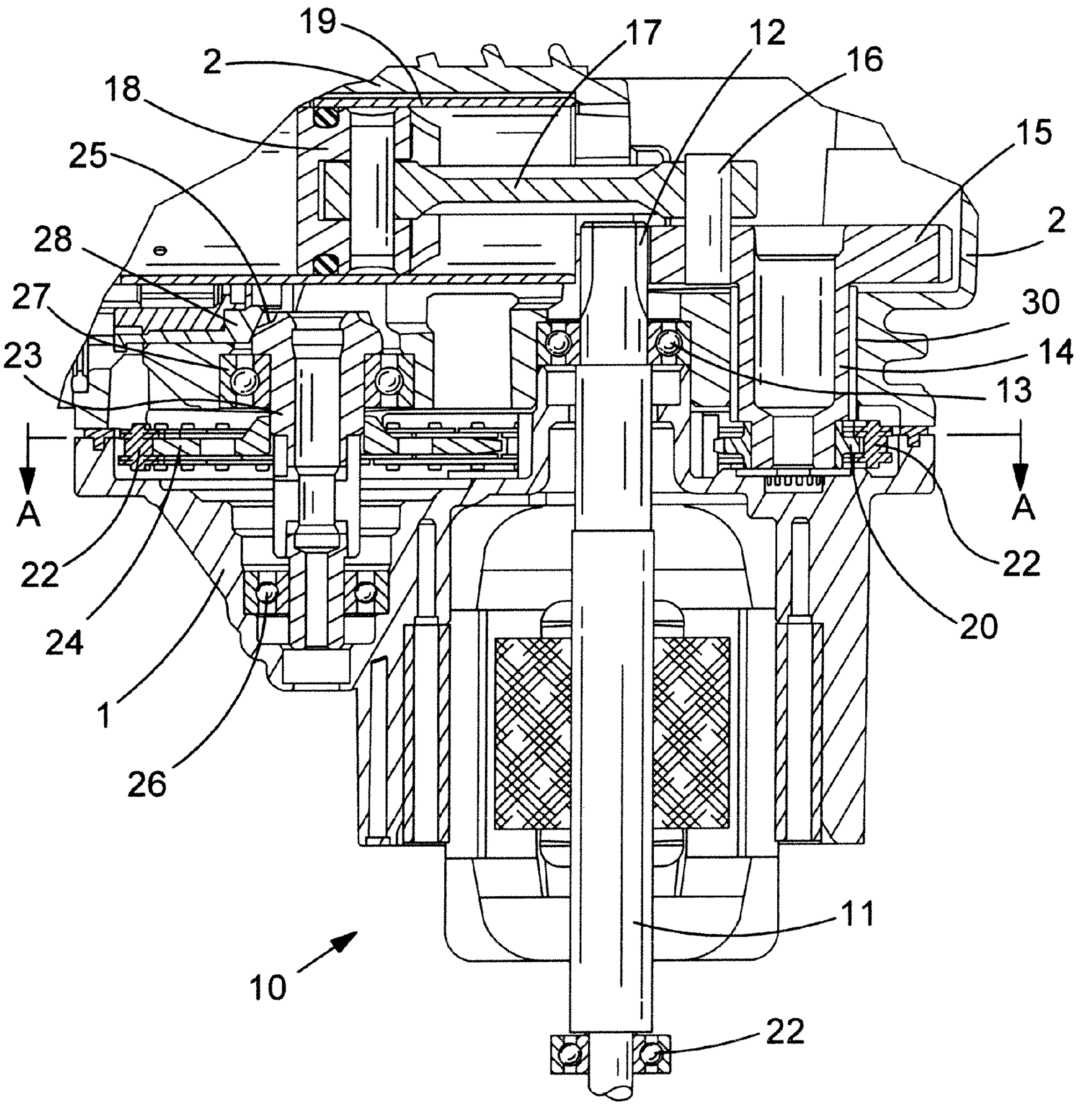
FIG. 2 shows a sectional view of a part of the rotary hammer of FIG. 1.
Figure 3:
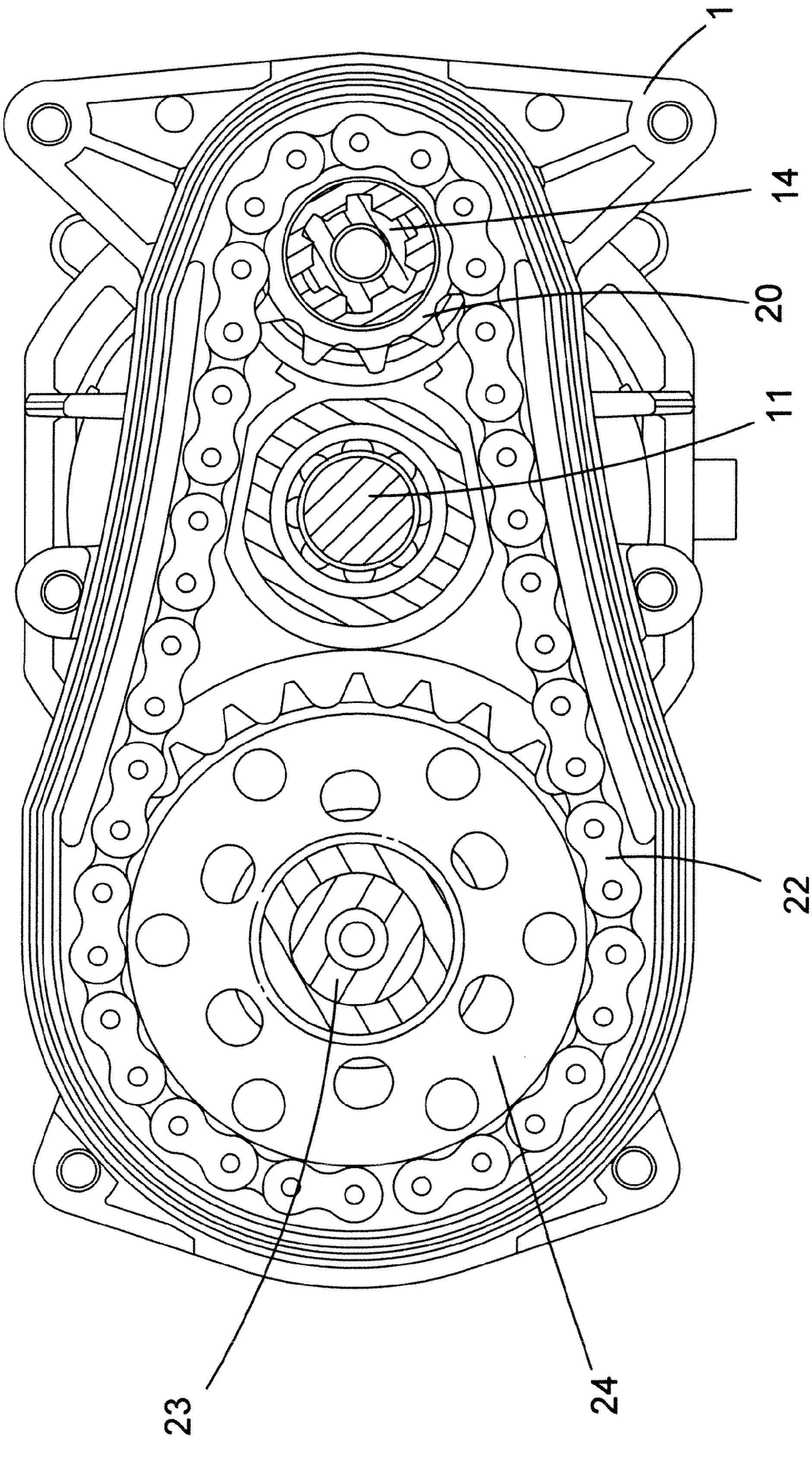
FIG. 3 shows a partial sectional view of the rotary hammer of FIGS. 1 and 2 along the line A-A of FIG. 2.

The rotary hammer shown in FIG. 1 has a housing which in the lower part forms a motor housing 1 to the lower end of which a housing cap 3 is releasably attached. At the rear end of the housing a handle 4 is provided in conventional manner from which handle a trigger element 5 projects which can be displaced against spring force to actuate the rotary hammer. At the front end of the housing a tool holder 6 for a hammer drill bit is provided which tool holder can be rotatingly driven. The electric power supply cable for providing power to the electric motor 10 (FIG. 2) is not shown.

The electric motor 10 is fixed in the motor housing 1. Its armature shaft 11 is supported in a lower ball bearing 40 which is mounted in the housing cap 3, and in an upper ball bearing 13 mounted in an upper housing 2. This upper housing contains, among other things, the pneumatic hammer mechanism. Such hammer mechanism is conventional for rotary hammers of this type and contains a fixed guiding tube 19 having its central axis arranged coaxially with respect to the longitudinal axis of the tool holder 6 and, thus, coaxially with respect to the axis of rotation of the tool holder. In the guide tube 19 a reciprocatingly drivable piston 18 is provided to which a rearwardly extending connecting rod 17 is pivotably mounted.

The rear end of this connecting rod 17 is pivotably connected to an eccentric pin 16 so that a crank drive is formed. Within the guide tube 19 an axially reciprocatable ram (not shown) is located in front of the piston 18. By the reciprocating movement of this piston generated by revolving of the eccentric pin 16 overpressure and underpressure is alternatingly generated between the piston 18 and the rear end of the ram, as well-known. Thereby the ram is driven forwardly to cause impacts on the rear end of the not-shown hammer drill bit provided in the tool holder 6 and is sucked back within the guide tube 19.

The armature shaft 11 of the electric motor 10 is arranged perpendicular to the axis of rotation of the tool holder 6. A first intermediate shaft 14 is arranged in parallel to the armature shaft 11 at its side facing away from the tool holder 6, i.e. at the right-hand side in FIG. 2, whereas at the opposite side of the armature shaft 11, i.e. at the left-hand side in FIG. 2, a second intermediate shaft 23 is provided and arranged in parallel to the armature shaft 11 and the first intermediate shaft 14.

The first intermediate shaft 14 is rotatably mounted in a sleeve bearing 30 and comprises a gear wheel 14 at its upper end formed in one piece with the intermediate shaft. This gear wheel meshes with a pinion 12 formed on the armature shaft 11 which pinion is provided above the upper bearing 13 of the armature shaft 11. In the gear wheel 15 the eccentric pin 16 is mounted which extends in parallel to the axis of rotation of the first intermediate shaft 14. Thus, rotation of the first intermediate shaft 14 results in a revolving movement of the eccentric pin 16 and, therefore, in driving of the hammer mechanism.

The second intermediate shaft 23 which is mounted in ball bearings 26 and 27, comprises a bevel gear toothing 25 at its upper end which toothing meshes with the bevel gear toothing of a rotation sleeve 28. This rotation sleeve is mounted coaxially on the guide tube 19, and its rotational movement causes rotation of the tool holder 6.

A sprocket 20 is non-rotatably mounted on the first intermediate shaft by means of splines. At the same height as this sprocket a sprocket 24 is non-rotatably mounted on the second intermediate shaft 23. The diameter of the sprocket 24 is larger than the diameter of the sprocket 20. The sprockets 20 and 24 are coupled by means of an endless chain 22. Thus, when the first intermediate shaft rotates due to rotation of the armature shaft 11 so that the hammer mechanism is driven, also the sprocket 24 and, thus, the second intermediate shaft 23 are rotatingly driven through the chain 22 so that the tool holder 6 rotates. The chain 22 surrounds the first intermediate shaft, the second intermediate shaft and the armature shaft 11. The different diameters of the sprockets 20 and 24 cause a speed reduction of the second intermediate shaft 23 compared to the rotational speed of the first intermediate shaft 14.

Numerous modifications may be made to the exemplary implementations described above. These and other implementations are within the scope of the following claims.

What is claimed is:

1. A rotary hammer comprising:

a housing;

a tool holder mounted on a front portion of the housing;

a motor mounted in the housing and including an armature shaft arranged substantially perpendicular to an axis of rotation of the tool holder, the armature shaft including toothing;

a hammer mechanism driven by the motor to generate impacts on a tool being held by the tool holder, the hammer mechanism including a first intermediate shaft adjacent and substantially parallel to the armature shaft facing away from the tool holder; and a rotation drive mechanism driven by the motor to rotatingly drive a tool being held by the tool holder, the rotation drive mechanism including a second intermediate shaft adjacent and substantially parallel to the armature shaft facing the tool holder, wherein the toothing of the armature shaft meshes with corresponding toothing on at least one of the first intermediate shaft and the second intermediate shaft, and further comprising a chain drive coupling the first intermediate shaft to the second intermediate shaft so that the first and second intermediate shafts are driven together by the armature shaft.

2. The rotary hammer according to claim 1, wherein the chain drive surrounds the armature shaft, the first intermediate shaft, and the second intermediate shaft.

3. The rotary hammer according to claim 1, wherein the first intermediate shaft, the second intermediate shaft and armature shaft are located, parallel to one other generally in a straight line.

4. The rotary hammer according to claim 1, further comprising a bearing for supporting an end of the armature shaft that is nearer to the hammer mechanism, the bearing being positioned between the toothing of the armature shaft and a plane of the chain drive.

5. The rotary hammer according to claim 1, wherein the toothing of the armature shaft meshes with the corresponding toothing on the first intermediate shaft.

6. The rotary hammer according to claim 5, wherein the toothing on the first intermediate shaft comprises a gear wheel at an upper end of the intermediate shaft, the gear wheel carrying an eccentric pin that forms part of a crank drive.

7. The rotary hammer according to claim 1, wherein the chain drive comprises a first sprocket mounted on the first intermediate shaft and a second sprocket mounted on the second intermediate shaft, the second sprocket having a diameter larger than a diameter of the first sprocket.

8. A rotary hammer comprising:

a housing;

a tool holder mounted on a front portion of the housing;

a motor mounted in the housing and including an armature shaft arranged substantially perpendicular to an axis of rotation of the tool holder, the armature shaft including toothing;

a hammer mechanism driven by the motor to generate impacts on a tool being held by the tool holder, the hammer mechanism including a first intermediate shaft adjacent and substantially parallel to the armature shaft facing away from the tool holder, wherein the toothing of the armature shaft meshes with corresponding toothing on the first intermediate shaft, the toothing on the first intermediate shaft including a gear wheel at an upper end of the first intermediate shaft, the gear wheel carrying an eccentric pin that forms part of a crank drive;

a rotation drive mechanism driven by the motor to rotatingly drive a tool being held by the tool holder, the rotation drive mechanism including a second intermediate shaft adjacent and substantially parallel to the armature shaft facing the tool holder;

a chain drive that includes a first sprocket mounted on the first intermediate shaft and a second sprocket mounted on the second intermediate shaft, the second sprocket having a diameter larger than a diameter of the first sprocket, and a chain connecting the first and second sprockets so that driving of the first intermediate shaft by the armature shaft causes driving of the second intermediate shaft; and a bearing for supporting an end of the armature shaft that is nearer to the hammer mechanism, the bearing being positioned between the toothing of the armature shaft and a plane of the chain drive.

* * * * *